Figure 1:
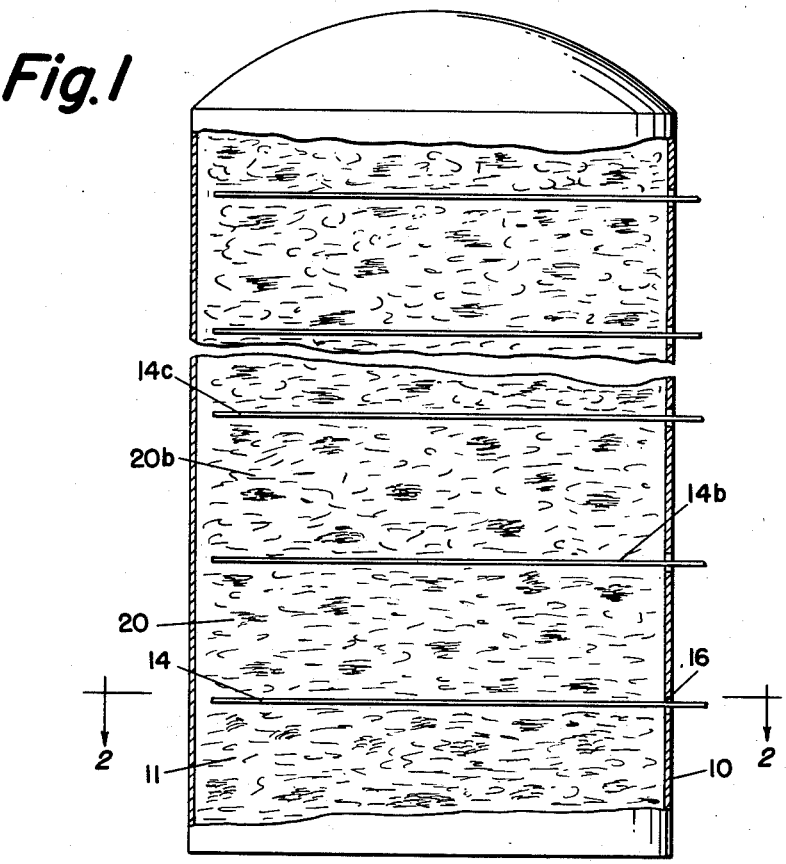

May 3, 1955

H. E. ARKENS 2,707,682

METHOD FOR TREATING GRASS SILAGE

Filed Dec. 10, 1952

2 Sheets-Sheet 1

INVENTOR.
HENRY E. ARKENS

BY

ATTORNEY

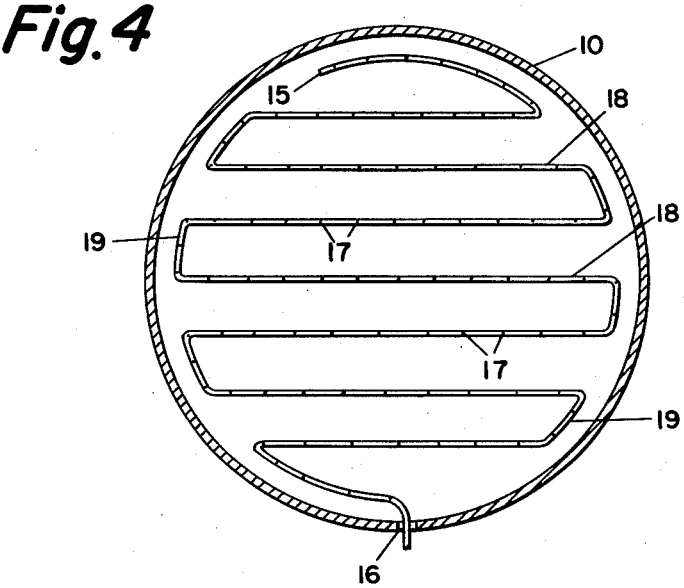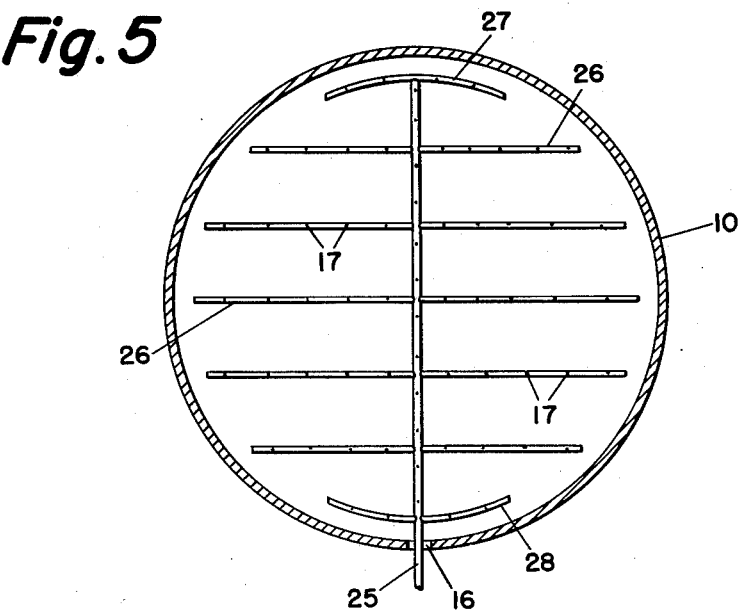

United States Patent Office 2,707,682
Patented May 3, 1955

2,707,682

METHOD FOR TREATING GRASS SILAGE

Henry E. Arkens, Marinette, Wis., assignor to Ansul Chemical Company, Marinette, Wis., a corporation of Wisconsin Application December 10, 1952, Serial No. 325,149

5 Claims. (Cl. 99—8)

This invention relates to a new method of applying liquid or gaseous preservatives to freshly cut forage crops for use as silage. More specifically, it relates to a new method of introducing liquid or gas phase sulfur dioxide into freshly cut forage crops for use as silage.

With the advent of grassland farming—a practice which both protects and enriches the soil—and the replacement of cultivated crops in the farming program by legumes, it became necessary to also replace such crops in the feeding program. Hay and grass silage, which is assuming a new place and a new importance in today's agriculture, become the natural feeds of such a program.

As the term is commonly used, grass silage is silage made from any green crops which might be dried and made into hay. This includes the legumes, such as alfalfa, clover, soybeans or peas, and the cereal grains, as well as meadow grasses. While coarse or weedy crops do not make the best silage, they do make better silage than hay.

Grass silage may be made in any kind of weather and for that reason saves the hay crop. Harvest losses in making hay are often heavy and the great reduction in the quality and feeding value are incurred by damage resulting from unfavorable weather. These losses are much less with the wetter silage cuttings than with the dry hay.

Grass silage is an excellent source of home grown proteins when fed in conjunction with good hay. This factor is of material importance when the high cost of protein concentrates is considered. Also, more of the nutrients of a hay crop are conserved by ensiling than by field drying.

First crop grasses, when put into silage, fit in nicely to balance the harvest schedule. This program allows the second crop sufficient moisture for a good start before dry weather sets in. Farmers and stock raisers in many locales find that a good legume or mixed hay crop will produce far more milk and meat-making nutrients per acre than any crop harvested for grain. The color and vitamin content of winter milk are increased through grass silage, keeping the quality of milk higher during these months.

In most instances, silage is a naturally fermented material, the chemical changes of which are brought about largely by bacteria. To produce the acid necessary for good preservation, however, the bacteria must have sufficient sugar or carbohydrate. Grasses and legumes are low in carbohydrates. Legumes are especially difficult to ensile because besides being low in carbohydrates they are high in protein and alkaline material.

Some of the carbohydrate preservatives that may be added to grass silage are ground shelled corn or small grain, corn and cob meal, molasses, hominy, and dried whey. Bacterial cultures, salt and other additives have also been tried.

Another effective method of producing good silage is to add acid to the green forage at the time of ensiling. A mixture of sulfuric acid and hydrochloric acid has been successfully used. However, the corrosive nature of the acids makes them troublesome.

In recent years much attention has been given to the wilting method of preserving grass silage. This method depends upon controlled moisture content of the crops at the time of ensiling. This again is a function of the weather.

Within the past few years, sulfur dioxide has been found to be a very effective preservative. It provides the proper acidity to inhibit mold growth and to inhibit the action of undesirable bacteria. In addition it reacts with oxygen present eliminating oxidative spoilage, such as loss of carotene. The method of applying sulfur dioxide to grass silage in current use involves the use of a lance or probe usually 4½ to 5 feet in length which is connected to a container of liquified gas by means of a suitable length of hose. Applicators of this type currently on the market utilize either the conventional screw type valve or, more recently, the squeeze type valve. In treating the crops by this method it is necessary to treat silage at 5 foot levels. About 26 injections per level are required for a tower silo 10 feet in diameter; 35 for a tower silo 12 feet in diameter; and 47 for a tower silo 14 feet in diameter. The actual amount of sulfur dioxide delivered per injection is a function of time and the sulfur dioxide pressure at the point of application. Usually, a table is included in the operating instructions which is calculated to give the number of seconds that the valve must be left open to deliver a given amount of sulfur dioxide. This quantity is based on the approximate amount of silage contained in a five foot layer.

This method of application has several objectionable features. First, the time required to treat a given layer is considerably in excess of the time it takes to change wagons. Second it is a rather laborious task. Third, it is necessary to take the applicator into the silo for the treatment and remove it after treatment is completed. No satisfactory method of hanging the applicator in the silo chute is available so that the applicator and its hose is out of the way of traffic.

Figure 2:
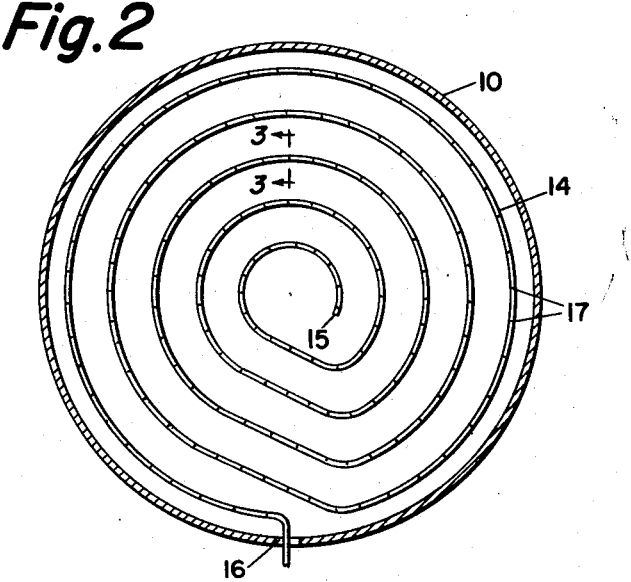
Figure 3:
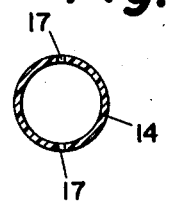

My invention overcomes these difficulties in treating silage and forage crops (moist crops including grain, hay, corn, etc.) placed in piles, stacks, tower silos or trench silos by means of tubings or pipes, placed in these crops substantially in accordance with the patterns described by the following specification and appended drawings, wherein:

Figure 1 is a vertical sectional view of a silo containing grass silage and tubings arranged in accordance with my invention, Figure 2 is a horizontal section view taken along lines 2—2 of Figure 1, Figure 3 is an enlarged sectional view taken along lines 3—3 of Figure 2, Figure 4 is a horizontal sectional view similar to Figure 2 showing a different pattern of tube arrangement, and Figure 5 is a horizontal sectional view similar to Figure 2 showing another modified pattern of tube arrangement.

Referring to the drawings, Figure 1 illustrates a conventional silo which may have a diameter anywhere from 10 to 20 feet and a height of 25 to 55 feet. A layer 11 of about two feet of green grass silage is placed in the bottom of the silo 10 and packed tightly. A flexible tube 14 is then positioned on the silage layer 11 in spiral arrangement as shown in Figure 2. The tube 14 has a closed end 15 and enters the silo 10 through a suitable opening or door 16 provided in the silo. The composition of the tube may be metallic such as iron and copper, plastic such as polyvinyl or polyethylene, rubber, paper, fibres such as acetate rayon or other classifications of tubings and pipes. They may be either rigid or flexible. The tube may either be porous, that is tubing that has ability to allow liquid to ooze or penetrate through the walls, or perforated with holes mechanically or manually positioned say from about $\frac{1}{32}$ inch to about $\frac{1}{16}$ inch in diameter arranged about an angle of 180° to each other as shown in Figure 3. The holes are preferably spaced a minimum of 6 inches apart and a maximum of 3 feet apart. It is preferred that the holes range from 12 to 18 inches apart to effect optimum distribution of the chemicals through the forage crops.

The spirals of the tube 14 are positioned so as to be spaced from each other about 6 to 30 inches and preferably about 18 inches. The outer spiral is likewise spaced from the inner wall of the silo preferably about 18 inches.

A layer of green grass forage 20 is then placed and packed on top of the spirally arranged tube 14 to a depth of anywhere up to 6 feet. Tube 14 is then connected to a suitable source of sulfur dioxide. The sulfur dioxide may be injected either as a gas or as a liquid product. For the purposes of this invention, I may use also water solutions of sulfur dioxide as well as the water solution of compounds containing available sulfur dioxide. Sulfur dioxide is added to the silage at the rate of 5 to 7 pounds per ton of fresh crop. Rates of three to twelve pounds per ton will preserve the crop, but optimum preservation occurs at the rate of five pounds per ton of grass legume mixtures and seven pounds per ton for straight legumes.

Another tube 14b similar to tube 14 is then positioned on the second forage layer in a spiral formation as previously described. A layer of green forage 20b is then placed over tube 14b to a depth up to 6 feet. Sulfur dioxide is then supplied to tube 14b in the amounts as previously described.

A third spirally arranged tube 14c is then placed on the forage layer 20b. Alternate layers of forage and tubes are similarly positioned in silo 10 until it is completely filled. Sulfur dioxide or other suitable silage preservative is fed through the tubes successively as each layer of forage is positioned thereon in the manner previously described. The tubes are arranged at such spacing from each other and in such pattern as to assure uniform distribution of sulfur dioxide or other preservative throughout the entire mass of silage. The time required may vary from 15 seconds to 15 minutes a layer depending on the size of tubes used, the size of the holes or character of the tubes. It is preferred to deliver the total required sulfur dioxide in about 3 to 5 minutes for each treatment.

The tubings or pipes preferably have an inside diameter from about $\frac{1}{16}$ inch to $\frac{1}{2}$ inch. These tubes or pipes are placed in the crops so that there is a depth of 1 to 6 feet between the point of application and the bottom of the pile or between the various points of application. The preferred depth of silage to be treated in these instances is 2½ to 3 feet. After these tubes have been placed in the silage, a depth of up to 3 feet of green forage crop may be placed above the tubes before treatment is begun. For most effective absorption and dispersion of the chemicals, such as sulfur dioxide, it is preferred that at least 1 foot of forage crop be placed above the tubes before treatment is begun. These tubes are then left in the forage crop. The next layer of green forage crop is placed on the first set of tubes. A new set of tubes or pipes is positioned and treatment is made when they are covered with the green forage crop. This method of treatment is followed until the total pile or silo is complete. The tubes may be removed from the green forage crop after treatment of a given layer and then used in the next treatment. All tubes may be positioned in the green forage crop at the proper levels and then all levels may be treated after the entire crop is in.

The following are specific examples in carrying out my invention using two silos. These silos were approximately 40 inches in diameter and 7 to 8 feet tall. Rubber tubings were employed. Each silo, both of steel construction, had four circular openings with a diameter of 1½ inch spaced equi-distant vertically in the silo wall. Couplings were welded to these openings so that it was possible to plug these holes when not in use.

Four 12½ foot lengths of ¼ inch I. D. rubber tubing were cut for silo No. 1. All lengths were treated in the following manner; a stopper was placed in one end. A $\frac{1}{32}$ inch drill was used to perforate the tubings starting at the stoppered end and continuing, at six inch intervals, to within one foot from the open end. Two holes were made with an angle of approximately 180° between them at each point.

Two feet of silage were placed in the bottom of the pilot silo and one of the hoses, prepared as described above, was placed in a spiral pattern, as shown in Figure 2, on top of the leveled silage so that the stoppered end was located approximately in the center of the cross section of the silo. The tubing was then spiralled so that the distance of a given section of tubing and its adjacent sections was approximately 12 inches. The outer section of tubing was placed so that it rested approximately six inches from the wall of the silo. The opened end of the tube was fitted through the bottommost opening in the silo wall so that approximately three inches were on the outside of the silo. Two and one half feet of silage were then placed on top of this spiral coil. The weight of all green crop placed in the silo was recorded and on the basis of a treatment of five pounds of sulfur dioxide per ton of green crop, 1.2 pounds of sulfur dioxide was injected through the spiral coil into the forage crop.

The apparatus used to transfer the liquid sulfur dioxide from the source of supply to the coil, spiralled in the green forage crop, consisted of a cylinder connector attached on one end of a ⅜ inch I. D. hose of suitable length, and a shut-off valve on the other end. A hose connector of sufficient size to tightly fit in a ¼ inch I. D. hose was then screwed into the other side of the shut-off valve. The procedure for treatment was as follows:

1. The cylinder valve was opened to allow transfer of liquid sulfur dioxide to the closed shut-off valve.
2. A weight was taken on the cylinder and its contents.
3. The hose connector was firmly fitted into the small hose which had been placed in the green forage crop.
4. The shut-off valve was opened and sulfur dioxide was allowed to flow into the green crop.
5. When the required amount of sulfur dioxide had been transferred to the crop the shut-off valve was closed.
6. After approximately 5 to 10 seconds the hose in the silage was detached from the transfer apparatus and shoved back into the silage.
7. A rubber stopper was placed in the opening in the silo wall.

The same procedure was followed in positioning the three remaining lengths of tubing and treating the green forage crop.

The second silo was filled in the same manner as the first silo. The only difference between silo No. 2 and silo No. 1 was the positioning of the holes in the rubber tubing. In this instance, holes of approximately $\frac{1}{32}$ inch in diameter were made in the four 12½ foot lengths of tubing starting three inches from the stoppered end and spaced 12 inches apart, again ending so that the last hole was one foot or so from the open end.

The third and a fourth treatment were made on piles of silage laid out on the floor of a building. Prior to setting up these piles, a 16 foot length of ¼ inch inside diameter rubber hose was stoppered on one end. Perforations were made in this hose in the manner described in Example 1 with these exceptions. Starting at the stoppered end holes approximately $\frac{1}{16}$ inch in diameter were made every six inches apart for the first six feet. For the next five feet, perforations of $\frac{3}{64}$ inch were made one foot apart and for the last five feet holes were made one foot apart with a $\frac{1}{32}$ inch drill.

A pile of silage approximately 4 feet square containing 325 pounds of green forage was made on the floor of a building. The hose was placed six inches from one edge of the pile, made a 180° arc and returned parallel to this first section and approximately 12 inches from it. At the end of this second length another 180° turn was performed keeping the distance between sections at 12 inches. The last section was placed approximately six inches from the near edge, and a small portion of the open end of the hose was allowed to hang over the edge of the pile. On top of this, 325 pounds of green forage material were placed. Approximately 1.6 pounds of liquid sulfur dioxide were injected into the green crop. The dispersion of the sulfur dioxide throughout the green material was noted as well as the evenness of distribution. The hose was removed from the pile and the green crop was transferred to a tile pilot silo.

The fourth treatment involved use of the same piece of tubing and identical conditions as the one described immediately above except that sulfur dioxide in gas phase was added to the green forage material. Also instead of placing 325 pounds of material down before the tubing was laid in place, 520 pounds of green forage was placed on a pile approximately 4 feet by 4 feet. The tubing was laid and the remaining 130 pounds of green crops were placed on top of the tubing.

A fifth treatment was made utilizing this same length of rubber tubing. Silo 2 had settled approximately three feet over a 24 hour period. The stoppered end of the 16 foot length of tubing was started in a spiral on top of this crop. The freshly cut crop was added to the top of this silo and as it was added, the rubber tubing was brought out and up. The pattern created was much like the design of a coil spring and 780 pounds of green material was used in this operation. Approximately 1.9 pounds of liquid sulfur dioxide were used in treating this amount of green forage.

My invention may be carried out in various modified procedures. For example, instead of positioning the tubes in spiral form as shown in Figure 2, I may arrange the tube in a series of spaced parallel rows 18 connected by alternating transverse sections 19. This tube is likewise provided with spaced openings 17. In Figure 5 another arrangement of tubes is illustrated wherein a manifold supply tube 25 extends diametrically across the silo 10 to which are suitably connected a plurality of parallel spaced tubes 26, the two outer tubes 27 and 28 being curved to complement the arcuate contour of the adjacent silo wall. These tubes are also closed at their ends and are provided with a plurality of spaced openings 17 for supplying the preserving agent.

The tubing used in my process may be left in the silage and either by virtue of the chemical reaction in the silage becomes edible to feeding animals or may be made of material which is edible without harmful effect on the animals. The flexible tubings may be perforated as described or may be made of porous materials which will permit escape of the preservative into the silage.

My process may be applied to green forage in silos as described or many be carried out on forage placed in stacks or in trenches. In such treatments it is essential to distribute the preservative uniformly throughout the entire mass of the silage with the most efficient utilization of the preservative so that minimum losses occur. In an average tower silo 40 feet high, anywhere from 5 to 20 sets of spaced tubes may be used for supplying the preservative, usually 14 to 17 such tubes being adequate for effective treatment. The number of tubes used may vary of course depending upon the size of tubes used, the rate of feed of the preservative, and the quantity and type of silage to be treated. These factors can be readily determined depending upon the actual working conditions in utilizing the novel principles of my invention. All the tubes may be connected to a common supply line provided outside or inside the silo, if desired, in any suitable manner.

The treatment of forage materials with 5 to 7 lbs. of sulfur dioxide per ton is very effective in preserving the materials for an indefinite period. The green forage should preferably contain 65% moisture. The forage should also be cut fine as possible, preferably ¼ inch. The forage should be packed tightly to eliminate air pockets prior to treatment. The treatment minimizes fermentation and preserves many of the original nutrients present in the unharvested crops. Natural flavor with increased palatability is also retained and the animals fed on the preserved silage thrive.

I claim:

1. A method of preserving green silage which comprises treating a mass of forage with a preservative by feeding the preservative to a plurality of substantially uniformly distributed points throughout said mass, then placing a second fresh mass of green forage thereon and treating said second green forage with a preservative by feeding the preservative to a plurality of substantially uniformly distributed points throughout said second mass of forage, and successively treating additional masses of superimposed green forage in like manner.

2. The method of preserving green silage as defined in claim 1 wherein the preservative is sulfur dioxide.

3. The method of preserving green silage as defined in claim 1 wherein the preservative is sulfur dioxide, said sulfur dioxide being added in amounts from about 3 lbs. to about 12 lbs. per ton of green silage.

4. A method of preserving green silage which comprises forming a layer of green silage, placing flexible tubing on said layer for emitting a plurality of streams of preservative at substantially uniformly distributed points, placing another mass of green silage on said flexible tubing, and feeding a preservative fluid under pressure to said tubing to eject a plurality of streams of preservative through uniformly distributed points in the combined mass of green silage.

5. A method of preserving green silage which comprises forming a layer of green silage, placing flexible tubing on said layer for emitting a plurality of streams of preservatives at substantially uniformly distributed points, placing another mass of green silage on said flexible tubing, and feeding sulfur dioxide under pressure in amount of 3 to 12 lbs. per ton of silage to said tubing to eject a plurality of streams of preservative through uniformly distributed points in the combined mass of green silage.

References Cited in the file of this patent

UNITED STATES PATENTS

| | | |
|---|---|---|
| 1,725,969 | Robinson | Aug. 27, 1929 |
| 2,631,099 | Ronotto | Mar. 10, 1953 |